United States Patent
Livanec et al.

(10) Patent No.: US 10,030,192 B2
(45) Date of Patent: *Jul. 24, 2018

(54) FREEZE/THAW STABLE LATEX EMULSION FOR TREATMENT OF WELL BORE TAR

(71) Applicant: Halliburton Energy Services, Inc., Houston, TX (US)

(72) Inventors: Philip Wayne Livanec, Deer Park, TX (US); Gregory Paul Perez, Pearland, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/024,720

(22) PCT Filed: Nov. 4, 2013

(86) PCT No.: PCT/US2013/068285
§ 371 (c)(1),
(2) Date: Mar. 24, 2016

(87) PCT Pub. No.: WO2015/065488
PCT Pub. Date: May 7, 2015

(65) Prior Publication Data
US 2016/0230076 A1 Aug. 11, 2016

(51) Int. Cl.
| E21B 21/00 | (2006.01) |
| C09K 8/524 | (2006.01) |
| C09K 8/04 | (2006.01) |
| C09K 8/035 | (2006.01) |
| E21B 21/06 | (2006.01) |
| E21B 37/06 | (2006.01) |
| C09K 8/528 | (2006.01) |
| C09K 8/588 | (2006.01) |

(52) U.S. Cl.
CPC ............ *C09K 8/524* (2013.01); *C09K 8/035* (2013.01); *C09K 8/04* (2013.01); *E21B 21/00* (2013.01); *E21B 21/062* (2013.01); *E21B 21/065* (2013.01); *E21B 37/06* (2013.01); *C09K 8/528* (2013.01); *C09K 8/588* (2013.01); *C09K 2208/18* (2013.01); *C09K 2208/20* (2013.01); *C09K 2208/24* (2013.01); *C09K 2208/26* (2013.01); *C09K 2208/28* (2013.01); *C09K 2208/32* (2013.01)

(58) Field of Classification Search
None
See application file for complete search history.

(56) References Cited

U.S. PATENT DOCUMENTS

| 3,960,214 | A |   | 6/1976  | Striegker et al. |
| 4,301,016 | A | * | 11/1981 | Carriere ............... C09K 8/24 507/119 |
| 4,324,669 | A |   | 4/1982  | Norman et al. |
| 7,665,523 | B2 |  | 2/2010  | Perez |
| 7,866,400 | B2 |  | 1/2011  | Steele et al. |
| 8,603,951 | B2 |  | 12/2013 | Perez |
| 8,752,626 | B2 | * | 6/2014  | Livanec ............... C09K 8/524 166/279 |
| 9,051,508 | B2 |  | 6/2015  | Livanec et al. |
| 2005/0037927 | A1 | | 2/2005 | Horton |
| 2006/0116294 | A1 | * | 6/2006 | Xiang ............... C08K 5/053 507/117 |
| 2008/0214413 | A1 | | 9/2008 | Ewanek |
| 2009/0095534 | A1 | | 4/2009 | Perez |
| 2012/0132423 | A1 | | 5/2012 | Livanec et al. |
| 2012/0283149 | A1 | | 11/2012 | Livanec et al. |
| 2013/0032409 | A1 | | 2/2013 | Livanec et al. |
| 2013/0153225 | A1 | * | 6/2013 | Livanec ............... C09K 8/524 166/300 |
| 2014/0194326 | A1 | | 7/2014 | Livanec et al. |
| 2014/0290692 | A1 | | 10/2014 | Hall et al. |
| 2014/0290958 | A1 | | 10/2014 | Marr et al. |

FOREIGN PATENT DOCUMENTS

| EP | 1203059 | 12/2005 |
| WO | 01/04232 | 1/2001 |

OTHER PUBLICATIONS

Scriven, L.E., "Direct observation of freeze-thaw instability of latex coatings via high pressure freezing and cryogenic SEM," Apr. 1, 2006, JCT Research.*

International Search Report and Written Opinion for International Application No. PCT/US2013/068285 dated Aug. 8, 2014.

Baractive product sheet from Halliburton Energy Services, Inc. retrieved from internet Mar. 2016.

* cited by examiner

*Primary Examiner* — Angela M DiTrani
(74) *Attorney, Agent, or Firm* — Tenley Krueger; Tumey L.L.P.

(57) ABSTRACT

Of the many compositions and methods provided herein, one method includes using a latex emulsion to treat well bore tar comprising. The method comprises providing a latex emulsion comprising a tar stabilizing polymer and water, combining the latex emulsion with alcohol, introducing a treatment fluid comprising the latex emulsion into a well bore, and contacting tar resident in the well bore with the treatment fluid wherein the latex emulsion at least partially reduces the tendency of the tar to adhere to a surface.

14 Claims, 1 Drawing Sheet

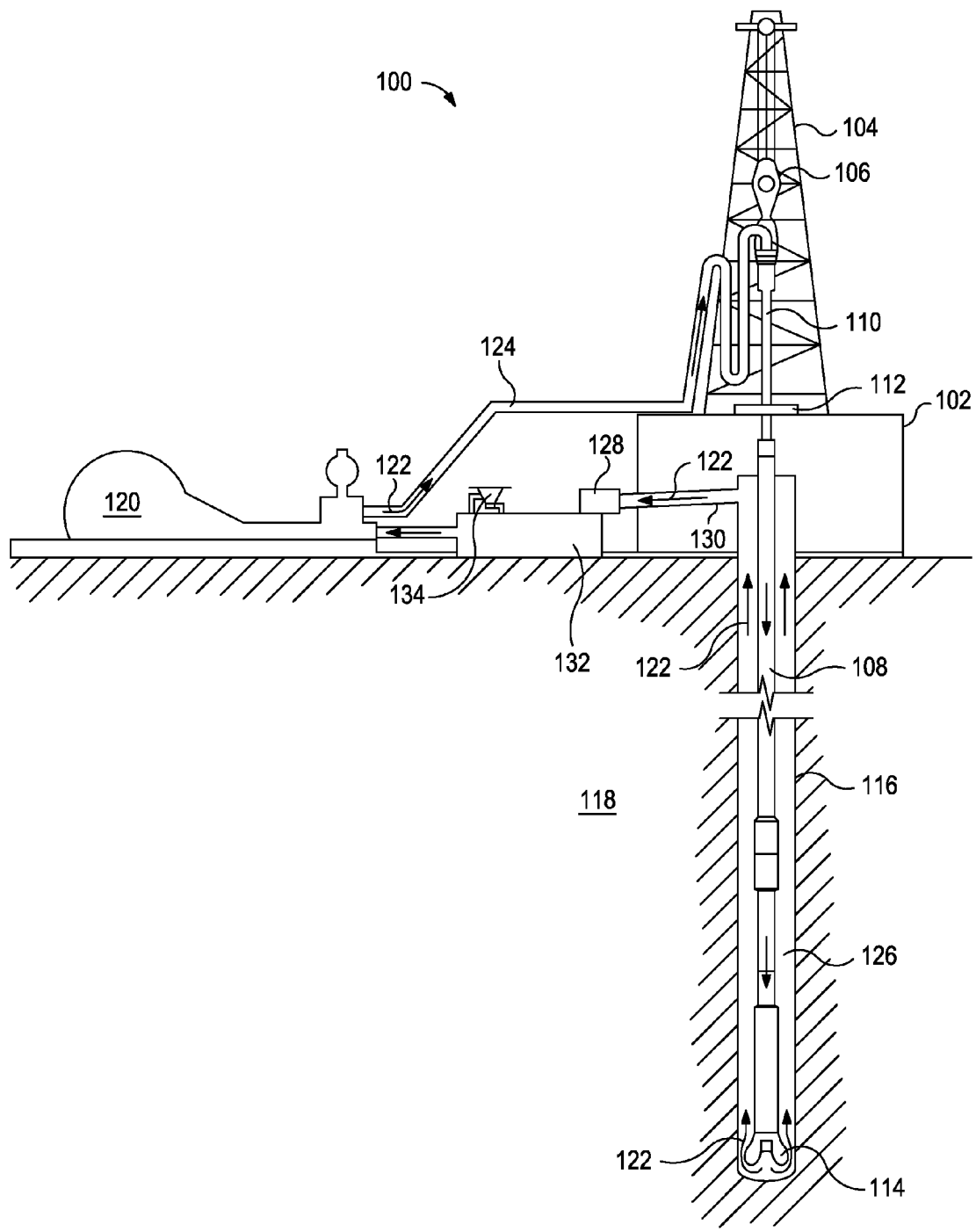

FREEZE/THAW STABLE LATEX EMULSION FOR TREATMENT OF WELL BORE TAR

BACKGROUND

The present embodiments relate to latex emulsions and, in some embodiments, to provision of latex emulsions with freeze/thaw stability for use in treatment of well bore tar.

Many subterranean operations involve the drilling of a well bore from the surface through rock and/or soil to penetrate a subterranean formation containing fluids that are desirable for production. In the course of drilling and other subterranean operations, the drill string and/or other equipment may come into contact with zones of rock and/or soil containing tar (e.g., heavy hydrocarbons, asphalt, bitumens); in many such operations, it may be desirable to drill the well bore through these tar-containing zones. However, tar is a relatively tacky substance that may readily adhere to any surface that it contacts, including the surfaces of the well bore and/or any equipment utilized during the drilling operation. Tar also may dissolve into many synthetic treatment fluids used in the course of drilling operations, increasing the tacky and adhesive properties of the tar. If a sufficient amount of tar adheres to surfaces in the well bore or drilling equipment, it may, among other problems, prevent the drill string from rotating, prevent fluid circulation, or otherwise impede the effectiveness of a drilling operation. In some cases, it may become necessary to remove and/or disassemble the drill string in order to remove accretions of tar, a process which may create numerous cost and safety concerns. The accretion of tar on drilling equipment and/or in the well bore also can impede any subsequent operations downhole, including cementing, acidizing, fracturing, sand control, and remedial treatments. In addition, soft, tacky tar that manages to reach the surface may foul surface equipment, including solids screening equipment.

Existing methods of managing these problems that result from well bore tar incursion may be problematic. Some of these methods involve effecting an increase in hydrostatic pressure in the well bore so as to force the tar out of the well bore to the surface. However, this increased hydrostatic pressure may damage the well bore and/or a portion of the subterranean formation. Other conventional methods utilize treatment fluids that comprise dispersants, surfactants, and/or solubilizers, which allow the tar particles to dissolve in or homogenize with the treatment fluids. However, the tar particles may not be readily separated out of the fluid once they have dissolved into or homogenized with the fluid. The presence of the tar particles in the treatment fluid may alter its rheological properties and/or suspension capacity, which may limit its use in subsequent operations. Moreover, the addition of these dispersants, surfactants, and solubilizers may increase the complexity and cost of the drilling operation.

Some problems with these preceding treatments for tar may be addressed by use of a latex emulsion that contains a tar stabilizing polymer. The tar stabilizing polymer may be used to treat the tar and make it less tacky. While the tar stabilizing polymer may be used for tar treatment, its use may be problematic in cold climates where the latex emulsion containing a tar stabilizer may be exposed to freezing temperatures. Sufficient freezing may result in a destabilization of a latex emulsion causing the emulsified tar stabilizing polymer to coagulate. If the tar stabilizing polymer coagulates, the latex emulsion may be irreversibly damaged wherein the tar stabilizer may not be able to be further emulsified, thus preventing successful incorporation of the tar stabilizing polymer in treatment fluids.

BRIEF DESCRIPTION OF THE DRAWINGS

These drawings illustrate certain aspects of some of the embodiments of the present method, and should not be used to limit or define the method.

FIG. 1 illustrates a system for preparation and delivery of a latex emulsion to a well bore in accordance with certain embodiments.

DETAILED DESCRIPTION

The present embodiments relate to latex emulsions and, in some embodiments, to provision of latex emulsions with freeze/thaw stability for use in treatment of well bore tar. In some embodiments, the latex emulsion comprises a tar stabilizing polymer and alcohol. As used herein, the term "latex emulsion" refers to a dispersion or an emulsion of one or more polymers within an aqueous continuous phase. As used herein, the term "tar stabilizing polymer" refers to a polymer or polymers that can interact with tar resident in a well bore wherein the tar becomes less tacky and/or less able to adhere to a surface. In certain embodiments, the tar stabilizing polymer may bind or coat the tar wherein the tar becomes less tacky. As a result, tar treated in this manner may be less likely to stick to drill strings and other tubulars used in drilling operations and, thus may be susceptible to screen separation from treatment fluids, drill cuttings, tar sands, and the like.

Embodiments comprise a latex emulsion. The latex emulsion may comprise a tar stabilizing polymer and water. The latex emulsion may further comprise alcohol and/or one or more surfactants. As will be discussed in more detail below, the alcohol may be included in embodiments of the latex emulsion to provide freeze/thaw stability, thus allowing expanded use of the latex emulsion in cold climate where freezing may occur. In some embodiments, the tar stabilizer polymer may be present in the latex emulsion in an amount of from about 1% to 70% by weight of the latex emulsion, alternatively, from about 20% to about 50% by weight, or, alternatively, from about 40% to about 45% by weight. In some embodiments, the tar stabilizing polymer may have a particle size of less than about 1 micron, alternatively, less than about 500 nanometers, or alternatively less than about 100 nanometers.

Examples of suitable tar stabilizing polymers include, but should not be limited to, styrene polymers, acrylate polymers, styrene-acrylate polymers, acrylonitrile-butadiene copolymers, styrene-butadiene copolymers, derivatives thereof, and/or combinations thereof. The suitable tar stabilizing polymer generally may be dispersed and/or emulsified in an aqueous fluid in accordance with present embodiments. In some embodiments, the tar stabilizing polymer may be ionic or nonionic in nature. In some embodiments, at least a portion of the tar stabilizing polymer may be crosslinked. In certain embodiments, the tar stabilizing polymer may interact with the tar resident in a well bore wherein the properties of the tar are altered. In certain embodiments, the tar stabilizing polymer may bind or coat the tar wherein the tar becomes less sticky.

Examples of styrene polymers that may be suitable for use in embodiments include, but are not limited to, styrene copolymers which include co-monomers of styrene or any derivative thereof. In some embodiments, the styrene polymer may be made by polymerizing styrene, which may be substituted or unsubstituted. The styrene may be substituted with any number of different groups that will be evident to those of ordinary skill in the art, including without limitation chloro groups, bromo groups, fluoro groups, alkyl groups, alkoxy groups, alkenyl groups, alkynyl groups, aryl groups, and substituted versions thereof. Combinations of styrene polymers may also be suitable in certain embodiments. In some embodiments, the styrene polymer may comprise styrene in an amount in a range of about 90% to about 100% by weight of the styrene polymer, about 95% to about 100% by weight of the styrene polymer, or about 99% to about 100% by weight of the styrene polymer. In one embodiment, the styrene polymer may consist of styrene. In some embodiments, the styrene polymer may be essentially free of acrylate and/or acrylic acid.

Examples of acrylate polymers that may be suitable for use in embodiments include, but are not limited to, acrylate copolymers which include co-monomers of acrylate or any derivative thereof. The acrylate may be substituted with any number of different groups that will be evident to those of ordinary skill in the art, including without limitation chloro groups, bromo groups, fluoro groups, alkyl groups, alkoxy groups, alkenyl groups, alkynyl groups, aryl groups, and substituted versions thereof. In accordance with present embodiments, the acrylate may comprise two or more units individually selected from the group consisting of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, any derivative thereof. Combinations of acrylate polymers may also be suitable, in certain embodiments. In some embodiments, the acrylate polymer may be formed by polymerizing acrylic acid, which may be subsequently neutralized to form the acrylate copolymer. In some embodiments, the acrylate polymer may comprise acrylate in an amount in a range of about 90% to about 100% by weight of the acrylate polymer, about 95% to about 100% by weight of the acrylate polymer, or about 99% to about 100% by weight of the acrylate polymer. In one embodiment, the acrylate polymer may consist of acrylate. In some embodiments, the acrylate polymer may be essentially free of styrene.

Examples of styrene-acrylate copolymers that may be suitable for use in embodiments include, but are not limited to, styrene-acrylate copolymers and mixed copolymers which include at least one unit comprising styrene, a substituted styrene, and any derivative thereof; and at least one comprising -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, or any derivative thereof. Combinations of suitable styrene-acrylate polymers may also be suitable in certain embodiments.

Examples of acrylonitrile-butadiene copolymers may comprise two or more different monomers that are copolymerized. One monomer that may be copolymerized to form the copolymer is acrylonitrile, which may be substituted or unsubstituted. The second monomer that may be copolymerized to form the copolymer is butadiene, which may also be substituted or unsubstituted. The monomers may be substituted with a number of different groups that will be evident to those of ordinary skill in the art, including without limitation chloro groups, bromo groups, fluoro groups, alkyl groups, alkoxy groups, alkenyl groups, alkynyl groups, aryl groups, alkoxy groups, and substituted versions thereof. The acrylonitrile-butadiene copolymer may be ionic or nonionic in nature. In one embodiment, the acrylonitrile-butadiene copolymer may be anionic. In some embodiments, the acrylonitrile-butadiene copolymer may be carboxylated. In some embodiments, the acrylonitrile content of the copolymer may be from about 1% to about 99% by weight of the copolymer. In some embodiments, the butadiene content may be from about 1% to about 99% by weight of the copolymer. In some embodiments, the acrylonitrile content may be from about 50% to about 95% by weight of the copolymer. In some embodiments, the butadiene content may be from about 5% to about 50% by weight of the copolymer. Embodiments of the copolymer may further be copolymerized with styrene as a third monomer. In some embodiments, the styrene content may be about 1% to about 25% by weight of the copolymer. In some embodiments, the copolymer may be an acrylonitrile-butadiene-styrene copolymer that comprises acrylonitrile from about 50% to about 95% by weight of the copolymer, butadiene from about 5% to about 50% by weight of the copolymer, and styrene from about 1% to about 25% by weight of the copolymer. Other monomers may also be included in the acrylonitrile-butadiene or acrylonitrile-butadiene-styrene copolymer in accordance with embodiments. However, the content of the additional monomers may be limited, in some embodiments, to less than about 10% by weight, less than about 5% by weight, or less than about 1% by weight. In some embodiments, the copolymer may be essentially free of additional monomers.

Examples of the styrene-butadiene copolymer may comprise two or more different monomers that are copolymerized. One monomer that may be copolymerized to form the copolymer is styrene, which may be substituted or unsubstituted. The second monomer that may be copolymerized to form the copolymer is butadiene, which may also be substituted or unsubstituted. The monomers may be substituted with a number of different groups that will be evident to those of ordinary skill in the art, including without limitation chloro groups, bromo groups, fluoro groups, alkyl groups, alkoxy groups, alkenyl groups, alkynyl groups, aryl groups, alkoxy groups, and substituted versions thereof. The styrene-butadiene copolymer may be ionic or nonionic in nature. In some embodiments, the styrene-butadiene copolymer may be anionic. In some embodiments, the styrene-butadiene copolymer may be carboxylated. In some embodiments, the styrene content of the copolymer may be from about 1% to about 99% by weight of the copolymer. In some embodiments, the butadiene content may be from about 1% to about 99% by weight of the copolymer. In some embodiments, the styrene content may be from about 50% to about 95% by weight of the copolymer. In some embodiments, the butadiene content may be from about 5% to about 50% by weight of the copolymer. Other monomers may also be included in the styrene-butadiene copolymer in accordance with embodiments. However, the content of the additional monomers may be limited, in some embodiments, to less than about 10% by weight, less than about 5% by weight, or less than about 1% by weight. In some embodiments, the copolymer may be essentially free of additional monomers.

In some embodiments, the latex emulsion may further comprise one or more alcohols as latex emulsion stabilizers. Without limitation, examples of alcohols include methanol, ethanol, propanol, isopropanol, butanol, etc., and derivatives thereof; glycols such as ethylene glycol, diethylene glycol, propylene glycol, dipropylene glycol, etc., and derivatives thereof; glycerols such as glycerin, polyglycerols, etc., and derivatives thereof; and combinations thereof. As demonstrated by the above examples, the alcohol may be a polyol. The alcohol used in embodiments may be provided from natural or synthetic sources. The alcohol may be provided to the latex emulsion as a liquid or as an emulsion. In embodiments, it is not necessary for the alcohol to actually prevent the latex emulsion from freezing in order to preserve latex emulsion functionality (e.g., a latex emulsion may still be functional after a freeze and thaw cycle). Without being limited by theory, it is believed that the alcohol aids in the suspension of the tar stabilizing polymers wherein the latex emulsion is not destabilized and the tar stabilizing polymers stay emulsified throughout one or more freeze and thaw cycles. In embodiments not comprising alcohol, a latex emulsion that has been frozen may lose functionality because the tar stabilizing polymers may coagulate and may be unable to be further emulsified. Further embodiments that comprise alcohol may comprise storing the latex emulsion in a manner wherein it may freeze and then thawing the latex emulsion before use. In embodiments, the latex emulsion may be frozen for at least one day (e.g. at least two days, at least three days, etc.). In embodiments comprising alcohol, the latex emulsion may undergo one or more freeze and thaw cycles. In embodiments comprising alcohol, the latex emulsion may remain stable after freezing at temperatures as low as $-20°$ C., $-30°$ C., $-40°$ C., or even lower. In embodiments, the alcohol may be present in an amount between about 1% to about 50% by weight of the latex emulsion and, alternatively, from about 5% to about 15% by weight. Efficacy and costs, among others, are factors to consider when choosing an amount of alcohol for an application.

Optionally, some embodiments may include a surfactant to aid the emulsification and/or suspension of the tar stabilizing polymers in the latex emulsion. Generally, any surfactant that will emulsify and/or suspend the tar stabilizing polymers may be used in the fluids of the present invention. In certain embodiments, it may be desirable to select a surfactant that will not emulsify the tar sought to be treated. In certain embodiments, the surfactants may be present in an amount sufficient to emulsify and/or suspend the tar stabilizing polymers. This amount may depend on, among other things, the type of surfactant used and the amount of polymer to be emulsified and/or suspended. A person of ordinary skill in the art will recognize, with the benefit of this disclosure, the type and amount of surfactant that should be added for a particular application.

In some embodiments, the latex emulsion may further comprise an aqueous fluid. For example, the tar stabilizing polymers may be dispersed in the aqueous fluid to form the latex emulsion. Additional amounts of aqueous fluid may be added to the latex emulsion prior to, during, or subsequent to the addition of alcohol and/or one or more surfactants. The aqueous fluid utilized in the latex emulsion may be fresh water, distilled water, or salt water (e.g., water containing one or more salts dissolved therein). In certain embodiments, the latex emulsion may be an aqueous-based fluid. Generally, the water can be from any source, provided that it does not contain compounds that undesirably affect other components of the treatment fluid.

In accordance with present embodiments, the latex emulsion may be used in a treatment fluid as described herein. As used herein, the term "treatment fluid" refers to any fluid that may be used in a subterranean operation in conjunction with a desired function and/or for a desired purpose. The term "treatment fluid" does not imply any particular action by the fluid or any component thereof. Treatment fluids may be used to drill, complete, work over, fracture, repair, or in any way prepare a well bore for recovery of materials residing in a subterranean formation penetrated by the well bore. Examples of include, but are not limited, cement compositions, drilling fluids, spacer fluids, and spotting fluids.

In some embodiments, the latex emulsion may be present in the treatment fluid in an amount of about 1% or more by volume of the fluid. In some embodiments, the latex emulsion may be present in the treatment fluid from about 1% to about 20% by volume of the treatment fluid. In some embodiments, the latex emulsion may be present in the treatment fluid from about 1% to about 10% by volume of the fluid. One of ordinary skill in the art, with the benefit of this disclosure, will be able to determine the appropriate amount of the latex emulsion to include in the treatment fluid for a particular application.

In some embodiments, the treatment fluid may further comprise an aqueous fluid. For example, the latex emulsion may be dispersed in the aqueous fluid to form the treatment fluid. The aqueous fluid utilized in the treatment fluids of the present invention may be fresh water, distilled water, or salt water (e.g., water containing one or more salts dissolved therein). In some embodiments, the treatment fluid may be an aqueous-based fluid, for example, in which the aqueous fluid may be the continuous phase. Generally, the water can be from any source, provided that it does not contain compounds that undesirably affect other components of the treatment fluid.

In some embodiments, the treatment fluid may further comprise a viscosifier to, for example, aid in suspending the latex emulsion in the treatment fluid. Suitable viscosifying agents may include, but are not limited to, colloidal agents (e.g., clays such as bentonite, polymers, and guar gum), emulsion-forming agents, diatomaceous earth, biopolymers, synthetic polymers, chitosans, starches, gelatins, or mixtures thereof.

Other additives suitable for use in subterranean operations may be added to embodiments of the treatment fluids. Examples of such additives include, but are not limited to, salts, surfactants, fluid-loss-control additives, gas, nitrogen, carbon dioxide, surface-modifying agents, tackifying agents, foamers, corrosion inhibitors, scale inhibitors, catalysts, clay-control agents, biocides, friction reducers, antifoam agents, bridging agents, dispersants, flocculants, hydrogen sulfide scavengers, carbon dioxide scavengers, oxygen scavengers, lubricants, viscosifiers, breakers, weighting agents (e.g., barite), relative-permeability modifiers, resins, particulate materials (e.g., proppant particulates), wetting agents, coating-enhancement agents, and the like. Weighting agents may be used in treatment fluids, such as drilling fluids, to provide a density sufficient to, for example, control formation pressures. One of ordinary skill in the art, with the benefit of this disclosure, will be able to determine which additional additives are appropriate for a particular application.

As will be appreciated by those of ordinary skill in the art, with the benefit of this disclosure, embodiments of the treatment fluids may be used in a variety of subterranean operations for treatment of tar resident in a well bore. By treatment of the tar with a tar stabilizer, as described herein, the adhesiveness of the tar may be reduced, thus facilitating removal of the tar from a well bore or other surface, for example. In one embodiment, a treatment fluid comprising the tar stabilizer may be introduced into the well bore wherein the tar stabilizer contacts the tar. One of ordinary skill in the art, with the benefit of this disclosure, should be able to determine the appropriate amount of time to allow the tar stabilizer to interact with the tar so as to at least partially reduce the adhesiveness of the tar. In certain embodiments, after the tar stabilizer has been allowed to interact with the tar, the tar then may be removed from the well bore by any means practicable for the given application.

In some embodiments, a treatment fluid comprising a latex emulsion may be introduced into a well bore as a drilling fluid. For example, a drill bit may be used to enlarge the well bore, and the treatment fluid comprising the latex emulsion may be circulated in the well bore past the drill bit. In some embodiments, the drilling fluid may be passed down through the inside of a drill string, exiting at a distal end thereof (e.g., through the drill bit), and returned to the surface through an annulus between the drill string and a well bore wall. Among other things the circulating drilling fluid should lubricate the drill bit, carry drill cuttings to the surface, and/or balance formation pressure exerted on the well bore. In certain embodiments, the drilling fluid may have a density in the range of from about 7.5 pounds per gallon ("lb/gal") to about 18 lb/gal, and alternatively from about 12 lb/gal to about 18 lb/gal.

Embodiments of the treatments fluids may be used as a drilling fluid, for example, where it is desirable to drill through tar encountered in the course of drilling the well bore. In this manner, the tar stabilizer contained in the treatment fluid may modify at least a portion of tar wherein it becomes less tacky, making it less likely to stick to drill strings and other tubulars used in drilling operations. Tar modified in this way may yield tar cuttings that can be removed more effectively from the well bore. Additionally, tar that is drilled through may be less likely to flow into the well bore or the subterranean formation as the plastic properties of the tar may be altered. Similarly, the treated tar that forms about the surface of the well bore may act to stabilize the well bore. In addition, tar treated with the tar stabilizers may be separated from a treatment fluid by passing the fluid through a screen or similar separation apparatus.

In some embodiments, a treatment fluid comprising a latex emulsion may be introduced into a well bore as a pill for spot treatment, wherein the treatment fluid is introduced into the well bore to interact with tar in a specific portion of the well bore. The pill should enter the well bore and interact with tar resident in the well bore, thus modifying at least a portion of the tar wherein it becomes less tacky. In embodiments, the tar stabilizer may be allowed to interact with the tar resident in the well bore for at least a time sufficient to at least partially reduce the adhesiveness of the tar. In some embodiments, this may be more than about one hour. In others, more time will be required to at least partially reduce the adhesiveness of the tar, depending upon, among other factors, the temperature inside the well bore and the amount of tar in the portion of the well bore being treated. One of ordinary skill in the art, with the benefit of this disclosure, will be able to determine the appropriate amount of time to allow the tar stabilizer to interact with the tar. In certain embodiments, after the tar stabilizer has been allowed to interact with the tar, the tar may then be removed from the well bore by any means practicable for the given application. In some embodiments, the pill may be used ahead of and/or behind a non-aqueous drilling fluid, which may comprise any number of organic liquids, including, but not limited to, mineral oils, synthetic oils, esters, paraffin oils, diesel oil, and the like.

In some embodiments, the amount latex emulsion present in the treatment fluid may be monitored while the tar stabilizer is circulated in the well bore. For example, once a unit of latex emulsion in a treatment fluid is allowed to interact with a unit of tar in a well bore, that unit of the latex emulsion may be depleted from the treatment fluid and thus unable to interact with additional tar. For this reason, it may be desirable to monitor the concentration of the latex emulsion in the treatment fluid to determine if more should be added. In some embodiments, the latex emulsion may be added to the treatment fluid before the treatment fluid is introduced into the well bore, for example, a batch-mixing process. In some embodiments, it may be desirable to continue to add the latex emulsion to the treatment fluid (e.g., "on-the-fly" mixing) according to the monitored concentration of the latex emulsion in the treatment fluid. In some embodiments, the concentration of latex emulsion in the treatment fluid may be monitored by direct measurement. In some embodiments, the concentration of latex emulsion in the treatment fluid may be monitored indirectly by measuring the depletion of the latex emulsion from the treatment fluid. The concentration of the latex emulsion in the treatment fluid may be monitored, for example, by analytical polymer spectroscopy, chromatography, gravimetry, and quantitative precipitation.

An embodiment comprises a method for using a latex emulsion to treat well bore tar comprising: providing a latex emulsion comprising a tar stabilizing polymer and water; combining the latex emulsion with alcohol; introducing a treatment fluid comprising the latex emulsion into a well bore; and contacting tar resident in the well bore with the treatment fluid wherein the latex emulsion at least partially reduces the tendency of the tar to adhere to a surface.

An embodiment comprises a method for providing freeze/thaw stability to a latex emulsion comprising: providing a latex emulsion comprising a tar stabilizing polymer and water; and adding alcohol to the latex emulsion to produce a latex emulsion comprising the tar stabilizing polymer, the alcohol, and the water.

An embodiment comprises a system for treating well bore tar comprising: a latex emulsion; wherein the latex emulsion comprises a tar stabilizing polymer, alcohol, and water; a treatment fluid; mixing equipment for mixing the latex emulsion with the treatment fluid; and pumping equipment coupled to the mixing equipment for pumping the treatment fluid into a well bore.

The exemplary latex emulsions disclosed herein may directly or indirectly affect one or more components or pieces of equipment associated with the preparation, delivery, recapture, recycling, reuse, and/or disposal of the disclosed latex emulsions. For example, and with reference to FIG. 1, the disclosed latex emulsions may directly or indirectly affect one or more components or pieces of equipment associated with an exemplary well bore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the drill bit 114 rotates, it creates a well bore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the well bore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the well bore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed latex emulsions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed latex emulsions may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed latex emulsions may be stored, reconditioned, and/or regulated until added to the drilling fluid 122.

As mentioned above, the disclosed latex emulsions may directly or indirectly affect the components and equipment of the drilling assembly 100. For example, the disclosed latex emulsions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary latex emulsions.

The disclosed latex emulsions may directly or indirectly affect the pump 120, which representatively includes any conduits, pipelines, trucks, tubulars, and/or pipes used to fluidically convey the latex emulsions downhole, any pumps, compressors, or motors (e.g., topside or downhole) used to drive the latex emulsions into motion, any valves or related joints used to regulate the pressure or flow rate of the latex emulsions, and any sensors (i.e., pressure, temperature, flow rate, etc.), gauges, and/or combinations thereof, and the like. The disclosed latex emulsions may also directly or indirectly affect the mixing hopper 134 and the retention pit 132 and their assorted variations.

The disclosed latex emulsions may also directly or indirectly affect the various downhole equipment and tools that may come into contact with the latex emulsions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed latex emulsions may also directly or indirectly affect any downhole heat exchangers, valves and corresponding actuation devices, tool seals, packers and other well bore isolation devices or components, and the like associated with the well bore 116. The disclosed latex emulsions may also directly or indirectly affect the drill bit 114, which may include, but is not limited to, roller cone bits, PDC bits, natural diamond bits, any hole openers, reamers, coring bits, etc.

While not specifically illustrated herein, the disclosed latex emulsions may also directly or indirectly affect any transport or delivery equipment used to convey the latex emulsions to the drilling assembly 100 such as, for example, any transport vessels, conduits, pipelines, trucks, tubulars, and/or pipes used to fluidically move the latex emulsions from one location to another, any pumps, compressors, or motors used to drive the latex emulsions into motion, any valves or related joints used to regulate the pressure or flow rate of the latex emulsions, and any sensors (i.e., pressure and temperature), gauges, and/or combinations thereof, and the like.

To facilitate a better understanding of the present invention, the following examples of specific embodiments are given. In no way should the following examples be read to limit or define the scope of the disclosure.

EXAMPLES

The following tests were performed to evaluate the use of glycerin as a latex emulsion stabilizer in freezing conditions. Sixteen samples were prepared comprising a latex emulsion (40-50% active), glycerin, and water. The latex emulsion comprised a polymer (styrene-acrylate copolymer), a surfactant, and water. The weight ratio of the individual components is described in the table below. Each sample was placed in a freezer at a temperature of −20° C. until frozen. After freezing, each sample was thawed and a visual inspection was made to confirm coagulation. The results are described below.

TABLE 1

Visual Inspection of Latex Emulsion Samples

| Ratio (Latex Emulsion:Water:Glycerin) | Coagulation? |
| --- | --- |
| 100:0:0 | Yes |
| 75:25:0 | Yes |
| 50:50:0 | Yes |
| 90:90:5 | Yes |
| 89:9:2 | Yes |
| 90:10:0 | Yes |
| 90:0:10 | Yes |
| 49:49:2 | Partial |
| 45:45:10 | No |
| 50:40:10 | No |
| 55:40:5 | Partial |
| 60:30:10 | No |
| 60:35:5 | Yes |
| 70:20:10 | No |
| 75:15:10 | No |
| 80:10:10 | Partial |

The 75:15:10 sample was further tested through an additional five freeze/thaw cycles at −20° C. and an additional three freeze/thaw cycles at −40° C. The sample maintained a stable emulsion throughout all of the freeze/thaw cycles.

Additionally the 75:15:10 sample was rolled with tar sands, and the sample demonstrated the same level of tar accretion as seen prior to freeze/thaw testing, indicating that inclusion of the glycerin in the latex emulsion did not impact its tar stabilization properties. In particular, the 75:15:10 sample was added to a sample drilling fluid in an amount of 10 pounds per lab barrel (350 mL) of the drilling fluid. The sample drilling fluid was formulated as shown in Table 1 below.

TABLE 1

Sample Drilling Fluid

| | |
|---|---|
| Fresh Water (lb/bbl) | 345.8 |
| Xanthan Gum (lb/bbl) | 0.701 |
| Starch (lb/bbl) | 4.206 |
| Cellulose (lb/bbl) | 0.701 |
| Caustic Soda (lb/bbl) | 0.05 |

For the test, the drilling fluid was placed in a lab barrel together with tar sands and a steel bar. The tar sands were included in an amount of 85 pounds per lab barrel of the sample drilling fluid. Tar sands with about 70-80% sands by weight and about 20-30% bitumen by weight were used in this test. The steel bar was used to mimic the drill strings interaction with the tar sands. The lab barrel was hot rolled for 16 hours at room temperature under 200 psi in a rolling cell, and thereafter the test rods were visually inspected for tar accretion. After hot rolling, the steel bar was visually inspected for tar accretion. The tar did not stick to the steel bar, and the fluid was not contaminated.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and they may be modified and practiced in different but equivalent manners apparent to those skilled in the art having the benefit of the teachings herein. Although individual embodiments are discussed, all combinations of all those embodiments are covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method for using a latex emulsion to treat well bore tar comprising:
   providing a latex emulsion comprising a tar stabilizing polymer and water, wherein the tar stabilizing polymer comprises an acrylonitrile-butadiene copolymer;
   combining the latex emulsion with alcohol;
   introducing a treatment fluid comprising the latex emulsion combined with the alcohol into a well bore; and
   contacting tar resident in the well bore with the treatment fluid wherein the latex emulsion at least partially reduces the tendency of the tar to adhere to a surface.

2. The method of claim 1, wherein the tar stabilizing polymer is anionic, and wherein the tar stabilizing polymer is carboxylated.

3. The method of claim 1 wherein the alcohol comprises an alcohol selected from the group consisting of methanol, ethanol, propanol, isopropanol, butanol, ethylene glycol, diethylene glycol, propylene glycol, dipropylene glycol, glycerin, polyglycerols, any derivatives thereof, and any combinations thereof.

4. The method of claim 1, wherein the latex emulsion comprises the tar stabilizing polymer in an amount of about 1% to about 70% by weight of the latex emulsion, and wherein latex emulsion comprises the alcohol in an amount of about 1% to about 50% by weight of the latex emulsion.

5. The method of claim 1, wherein the latex emulsion is present in the treatment fluid in an amount of about 1% to about 20% by volume of the treatment fluid.

6. The method of claim 1, further comprising freezing the latex emulsion and thawing the latex emulsion prior to introducing the treatment fluid into the well bore.

7. The method of claim 1, wherein the treatment fluid further comprises a viscosifier selected from the group consisting of a colloidal agent, a clay, a polymer, guar gum, an emulsion-forming agent, diatomaceous earth, a biopolymer, a synthetic polymer, chitosan, a starch, a gelatin, and any combination thereof.

8. The method of claim 1, wherein the treatment fluid further comprises an additive selected from the group consisting of a salt, a surfactant, a fluid-loss-control additive, a gas, nitrogen, carbon dioxide, a surface-modifying agent, a tackifying agent, a foamer, a corrosion inhibitor, a scale inhibitor, a catalyst, a clay-control agent, a biocide, a friction reducer, an antifoam agent, a bridging agent, a dispersant, a flocculant, hydrogen sulfide scavenger, carbon dioxide scavenger, an oxygen scavenger, a lubricant, a viscosifier, a breaker, a weighting agent, barite, a relative-permeability modifier, a resin, a particulate material, a proppant particulate, a wetting agent, a coating-enhancement agent, and any combination thereof.

9. The method of claim 1, further comprising monitoring the concentration of the latex emulsion in the treatment fluid, and adding additional latex emulsion to the treatment fluid in response to the monitoring.

10. The method of claim 1, further comprising using a drill bit to enlarge the well bore; and circulating the treatment fluid past the drill bit to at least remove cuttings from the drill bit.

11. The method of claim 1, further comprising separating at least a portion of the tar contacted with the treatment fluid from the treatment fluid.

12. A system for treating well bore tar comprising:
a latex emulsion; wherein the latex emulsion comprises a tar stabilizing polymer, alcohol, and water, wherein the tar stabilizing polymer comprises an acrylonitrile-butadiene copolymer;
a treatment fluid;
mixing equipment for mixing the latex emulsion with the treatment fluid; and
pumping equipment coupled to the mixing equipment for pumping the treatment fluid into a well bore.

13. The system of claim 12, wherein the tar stabilizing polymer is anionic, and wherein the tar stabilizing polymer is carboxylated.

14. The system of claim 12, wherein the latex emulsion comprises the tar stabilizing polymer in an amount of about 1% to about 70% by weight of the latex emulsion, and wherein latex emulsion comprises the alcohol in an amount of about 1% to about 50% by weight of the latex emulsion.

* * * * *